United States Patent Office 3,407,056
Patented Oct. 22, 1968

3,407,056
HERBICIDAL COMPOSITION AND METHOD
Herbert Schwartz, Chimes Terrace,
Vineland, N.J. 08360
No Drawing. Continuation-in-part of application Ser. No. 451,991, Apr. 29, 1965. This application Mar. 17, 1966, Ser. No. 535,032
13 Claims. (Cl. 71—118)

ABSTRACT OF THE DISCLOSURE

Novel herbicidal compositions comprising at least one compound of the formula

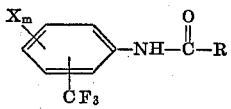

wherein X is selected from the group consisting of halogen, nitro, lower alkoxy, $NH_2$, and mono- and di-lower alkyl amino, m is an integer from 0 to 2 and R is selected from the group consisting of hydrogen, aliphatic and halogenated aliphatic radicals having 1 to 10 carbon atoms, cycloaliphatic radicals having 3 to 8 carbon atoms, and aralkyl and aryl radicals and a major amount of an inert carrier. The invention also relates to a novel method of regulating the growth of plants.

PRIOR APPLICATIONS

This application is a continuation-in-part applciation of my copending United States patent application Ser. No. 451,991, filed Apr. 29, 1965 and now abandoned, which, in turn, is a continuation-in-part application of my United States patent application Ser. No. 293,863, filed July 9, 1963 and now abandoned.

PRIOR ART

The commercial use of herbicides has only recently begun to reach substantial proportions and a great deal of research has been conducted in this field in the last few years. Anilides substituted directly on the phenyl group are now commercially available. Examples of these compounds are 3',4'-dichloropropionanilide, (Stam), 3',4'-dichloromethylacrylanilide (Dicryl), 3',4'-dichloro-α-methylvaleranilide (Karsil), and 3'-chloro-4'-methyl-α-methylvaleranilide (Solan). The said halogenated anilides, however, possess only post-emergence herbicidal activity and are not seelctive in their activity on a variety of crops.

OBJECTS OF THE INVENTION

It is an object of the invention to provide novel plant growth regulating compositions containing a trifluoromethylanilide of Formula I as the active agent.

It is another object of the invention to provide a novel method of selectively regulating the growth of plants.

It is an additional object of the invention to provide novel trifluoromethylcycloalkanecarboxanilides.

These and other objects and advantages of the invention will become obvious from the following detailed description.

THE INVENTION

The novel herbicidal compositions of the invention are comprised of at least one trifluoromethylanilide of the formula

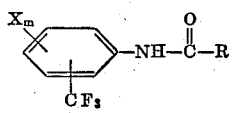

wherein X is selected from the group consisting of halogen, nitro, lower alkoxy, $NH_2$, and mono- and di-lower alkyl amino, m is an integer from 0 to 2 and R is selected from the group consisting of hydrogen, aliphatic and halogenated aliphatic radicals having 1 to 10 carbon atoms in which the longest carbon chain is six carbon atoms, cycloaliphatic radicals having 3 to 8 carbon atoms, aryl radicals and aralkyl radicals in which the alkyl chain contains 1 to 6 carbon atoms and a major amount of an inert carrier.

The compositions may be in the form of dusting preparations or solutions, emulsions, dispersions or concentrates.

Preferred compounds of the invention are compounds in which R is selected from the group consisting of hydrogen, lower alkyl and halogenated lower alkyl radicals having 1 to 7 carbon atoms, lower alkenyl radicals having 2 to 7 carbon atoms, cycloaliphatic radicals of the formula $-CH(CH_2)_m$ wherein m is an integer from 2 to 7, aryl radicals having the formula

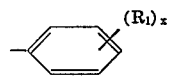

and aralkyl radicals having the formula

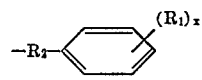

wherein $R_2$ is an alkylene or alkenylene radical having 1 to 6 carbon atoms, $R_1$ is seelcted from the group consisting of halogen and lower alkyl and x is an integer from 1 to 5.

The compounds of Formula I are distinguished from the prior art halogenated anilides not only be chemical structure but also in their plant growth regulating activity. The trifluoromethylanilides of Formula I possess both pre-emergence and post-emergence activity while the prior art halogenated anilides possess only post-emergence activity which limits their application. In addition, the trifluoromethylanilides possess a different seelctivity in their herbicidal activity. For example, 3'-trifluoromethyl-α-methylvaleranilide is an effective herbicide against Johnson grass without harming cotton or tomato plants while 3',4'-dichloropropionanilide (Stam), kills almost everything but rice and 3'-chloro-4'-methyl-α-methylvaleranilide (Solan), kills almost everything but tomatoes. Therefore, the former is effective in controlling the growth of weeds in cotton fields while the latter are not.

The method of the invention for selectively regulating the growth of plants comprises contacting the plants with an effective amount of at least one trifluoromethylanilide of the formula

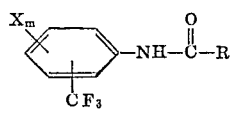

wherein X is selected from the group consisting of halogen, nitro, lower alkoxy, —NH₂ and mono and di-lower alkyl amino, m is an integer from 0 to 2 and R is selected from the group consisting of hydrogen, aliphatic and halogenated aliphatic radicals having 1 to 10 carbon atoms in which the longest carbon chain is 6 carbon atoms, cycloaliphatic radicals having 3 to 8 carbon atoms and aryl radicals and aralkyl radicals in which the alkyl radical has 1 to 6 carbon atoms. The usual effective dose is 1 to 50 pounds, preferably 1 to 10 pounds, per acre of the trifluoromethylanilide.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachloroethane, trichloroethylene or tri- or tetrachlorobenzenes.

Aqueous preparations suitable for application can be prepared by the addition of water to emulsion concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecylmercaptan with 12 molecular proportions of ethyleneoxide. Among anion active emulsifying agents there may be mentioned the sodium salt of dodecyl alcohol sulfuric acid ester, the sodium salt or dodecyl-benzene sulfonic acid, the potassiu mor triethanolamine salt of oleic acid or abietic acid or of a mixture of these acids, or the sodium salt of petroleum-sulfonic acid. As cation-active dispersing agents there may be used, quaternary ammonium compounds, such as cetylpyridinium bromide or di-(hydroxyethyl)-benzyl-dodecyl-ammonium chloride.

For making dusting or scattering preparations, there may be used as solid carriers talcum, kaolin, bentonite, calcium carbonate or calcium phosphate or carbon, cork meal or wood meal or other materials of vegetable origin. The various preparations can be rendered more suitable for the various ways in which they are to be used by the known addition of substances which improve the dispersion, adhesiveness, resistance to rain or penetration capacity of the compositions. As such substances, there may be mentioned fatty acids, resins, glue, casein, or, for example, alginates or the like.

The trifluoromethylanilide herbicidal compositions can also contain herbicidal oxidizing ions to obtain synergistic herbicidal compositions. Examples of suitable oxidzing ions are dipyridylium salts such as 1,1'-ethylene-2,2'-dipyridylium dibromide (Diquat), 1,1'-dimethyl-4,4'-dipyridylium di(methylsulfate) (Paraquat), etc; alkali metal and alkaline earth metal nitrate salts such as sodium nitrate, calcium nitrate, etc.; herbicidal arsenical compounds such as monoalkanearsonic acids and lower dialkylarsinic acids such as methanearsonic acid, propanearsonic acid, dibutylarsinic acid, dipropylarsinic acid, cacodylic acid (hydroxyldimethylarsine oxide), etc., and their alkali metal, alkaline earth metal and amine salts such as monosodium methanearsonate (MSMA), disodium methanearsonate (DSMA), calcium hydrogen methanearsonate, and amine salts of the said arsonic acid where the amine is ethanolamine, triethanolamine, isopropylamine, tri-isopropanolamine, mixtures of alkylamines having 8 to 14 carbon atoms, etc.

The trifluoromethylcycloalkanecarboxanilides of Formula I are novel compounds and possess unexpected herbicidal selectivity not possessed by the corresponding halogen substituted cycloalkanecarboxanilides. As shown in Example IX, the trifluoromethylcycloalkanecarboxanilides possess a high degree of herbicidal activity but not against valuable crops, such as cotton and rice, while the corresponding halogenated compounds do not possess this selectivity.

The trifluoromethylanilides of Formula I can be made by the usual methods of forming anilides. For example, a 2',3' or 4'-trifluoromethylaniline can be reacted with the acid halide or acid anhydride of the desired carboxylic acid.

In the following examples, there are described several preferred embodiments to illustrate the invention. However, it should be understood that the invention is not intended to be limited to the specific embodiments.

Example I

The compounds of the invention were prepared by reacting a trifluoromethylaniline with the desired organic acid halide or organic acid anhydride. In Table I there are listed a number of compounds of the invention with their melting points.

TABLE I

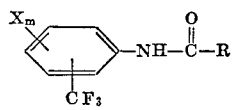

| Position of CF₃ Group | R | Xₘ | Melting Point, °C. | Percent Nitrogen | |
|---|---|---|---|---|---|
| | | | | Calculated | Found |
| 3 | —H | | 53.5–54.5 | 7.40 | 7.35 |
| 3 | —CH₃ | | 104–105 | | |
| 3 | —CF₃ | | 63–64 | 5.45 | 5.60 |
| 3 | —CCl₃ | | 104–105 | 4.57 | 4.80 |
| 3 | —CH₂—CH₃ | | 70–71 | 6.45 | 6.39 |
| 3 | —C(CH₃)=CH₂ | | 95–96 | 6.11 | 6.25 |
| 3 | —CH(CH₃)—CH₃ | | 100–101 | | |

| Position of CF₃ Group | R | X_m | Melting Point, °C. | Percent Nitrogen | |
|---|---|---|---|---|---|
| | | | | Calculated | Found |
| 3 | -CH(CH₃)-CH₂-CH₂-CH₃ | | 71-72 | 5.40 | 5.39 |
| 3 | -CH₂-Cl | | 79-80 | 5.90 | 5.88 |
| 3 | -C₆H₅ | | 111-112 | 5.29 | 5.32 |
| 3 | -C(CH₃)₂-CH₂-CH₂-CH₃ | | 60-61 | 5.12 | 5.20 |
| 3 | -C₆H₄Br | | 121-122 | 4.07 | 4.14 |
| 3 | -C₆H₃Cl₂ (2,4-di) | | 145.5-146 | 4.19 | 4.28 |
| 3 | -C₆H₃Cl₂ (3,4-di) | | 147-148 | 4.19 | 4.25 |
| 3 | -C₆H₄CH₃ | | 126-126.5 | 5.01 | 4.96 |
| 3 | -CH₂-C₆H₅ | | 83-84 | | |
| 3 | -CH=CH-C₆H₅ | | 102-103 | 4.92 | 4.62 |
| 2 | -C₆H₅ | | 145-146.5 | 5.29 | 5.39 |
| | -C(CH₃)₃ | | 109.5-110 | 5.71 | 6.00 |
| 3 | -CH=CH-CH₃ | | 55-57 | 6.12 | 6.13 |
| 3' | cyclopropyl (-CH(CH₂-CH₂)) | | 114.5 | 6.11 | 6.05 |
| 3' | -CH(CH₂-CH₃)-CH₂ | | 102-104 | 5.76 | 5.51 |
| 3' | cyclopentyl | | 84-85 | 5.44 | 5.54 |
| 3' | cyclohexyl | | 109.5-110.5 | 5.16 | 5.44 |
| 3' | cyclopropyl | 6'-chloro | 115-116 | 5.32 | 5.28 |
| 3' | cyclopropyl | 4'-chloro | 127-128 | 5.32 | 5.21 |
| 3' | cyclobutyl | 4'-chloro | 92-93 | 5.05 | 4.95 |
| 3' | cyclopropyl | 4'-N(CH₃)₂ | 114-116 | 10.29 | 10.24 |
| 3' | -C₆H₅ | 4'-N(CH₃)₂ | 114-115 | 9.09 | 9.10 |

| Position of CF₃ Group | R | $X_m$ | Melting Point, °C. | Percent Nitrogen Calculated | Percent Nitrogen Found |
| --- | --- | --- | --- | --- | --- |
| 2' | —C₆H₅ | 4'—N(CH₃)₂ | 198–200 | 9.09 | 9.03 |
| 3' | —C(CH₃)₃ | 4'—Cl | 134–135 | 5.74 | 5.80 |
| 3' | —CH=CH—CH₃ | 4'—Cl | 113–117 | 6.14 | 5.99 |
| 3' | —CH₂—CH₃ | 4'—Cl | 100–101 | 6.48 | 6.51 |
| 3' | —CH₃ | 4'—Cl | 115–116 | 6.93 | 6.88 |
| 3' | —C(CH₃)₃ | 6'—Cl | 106.5–108.5 | 4.94 | 4.91 |
| 3 | —CH₂—CH₂—CH₃ | 4'—Cl | 77–79 | 6.08 | 6.11 |
| 3 | —CH=CH—C₆H₅ | 4'—Cl | 137–138 | 4.83 | 7.78 |
| 3 | H | 4'—Cl | 99–100 | 7.44 | 7.45 |
| 3 | —C₆H₄—Cl | 4'—Cl | 135–136 | 4.69 | 4.57 |
| 3 | —C₆H₄(Cl) | 4'—Cl | 139–140 | 4.69 | 4.61 |
| 3 | —C₆H₄(Cl) | 4'—Cl | 150–153 | 4.69 | 4.66 |
| 3 | —CCl₃ | 4'—N(CH₃)₂ | 64–67 | 8.01 | 7.98 |
| 3 | —CCl₃ | 4'—Cl | 108–110 | 4.11 | 4.08 |
| 3 | —CCl₃ | 4'—Br | 94–95 | 4.64 | 3.71 |

Example II.—General post-emergence herbicidal activity

To demonstrate the general herbicidal activity of the trifluoromethylanilides of the invention, some of the compounds listed in Table I were applied to seven different plants according to the following procedure.

The compounds were prepared as 10% emulsion concentrates in two specific types of solvents as follows:

Formula F:                                         Percent by weight
    Compound _____ 10
    Triton X–161 _____ 10
    Solvent F _____ 80
Formula 50M:
    Compound _____ 10
    Triton X–161 _____ 10
    Solvent 50M _____ 80

Triton X–161 is a blend of anionic and nonionic alkyl aryl polyether alcohols and organic sulfonates. Solvent F is a 50:50 by volume mixture of diethylene glycol monobutyl ether acetate and Velsicol AR 50 (methylated naphthalenes). Solvent 50M is a 20:80 by volume mixture of ethyl acetate and Velsicol AR 50. Before application, the concentrates were diluted to a concentration of 2000 p.p.m. of the compound being tested.

The seven crops to be tested had been planted in flats 12 to 14 days before the tests and were well established seedlings. The plants were sprayed by a precision turntable technique in which 30 ml. of the spray solution (about 2.5 pounds per acre) was applied to each flat containing the seven crops. The plants were then kept under constant daily surveillance for a period of 7 to 14 days. The final phytotoxicity data were recorded at the end of 14 days and the plants were scored for phytotoxicity ratings on a scale from 0 (no injury to plants), to 10 (all the plants were killed). The results of the tests are summarized in Table II.

TABLE II.—POST-EMERGENCE HERBICIDAL ACTIVITY OF 3'-TRIFLUOROMETHYLANILIDE SERIES OF CHEMICALS

| Compound | Solvent | Phytoxicity Rating | | | | | | |
|---|---|---|---|---|---|---|---|---|
| | | Beets | Tomato | Radish | Flax | Rye Grass | Oats | Wheat |
| 3'-trifluoromethyl benzanilide | F | 2 | 9 | 9 | 10 | 7 | 9 | 0 |
| | 50M | 10 | 10 | 10 | 10 | 7 | 6 | 0 |
| 3'-trifluoromethyl acetanilide | F | 10 | 10 | 10 | 10 | 9 | 9 | 1 |
| | 50M | 10 | 10 | 10 | 10 | 8 | 9 | 1 |
| 3'-trifluoromethyl-2-bromobenzanilide | F | 9 | 10 | 10 | 10 | 10 | 10 | 4 |
| | 50M | 10 | 10 | 10 | 10 | 10 | 10 | 7 |
| 3'-trifluoromethyl propionanilide | F | 10 | 10 | 10 | 10 | 10 | 10 | 4 |
| | 50M | 10 | 10 | 10 | 10 | 10 | 10 | 10 |
| 3'-trifluoromethyl-3,4-dichlorobenzanilide | F | 8 | 9 | 8 | 10 | 9 | 10 | 3 |
| | 50M | 10 | 10 | 8 | 10 | 8 | 9 | 5 |
| 3'-trifluoromethyl-4-nitrobenzanilide | F | 10 | 7 | 9 | 9 | 5 | 5 | 6 |
| | 50M | 10 | 7 | 10 | 4 | 8 | 8 | 3 |
| 3'-trifluoromethyl-methacrylanilide | F | 5 | 4 | 3 | 1 | 1 | 8 | 9 |
| | 50M | 10 | 10 | 9 | 9 | 7 | 9 | 9 |
| 3'-trifluoromethyl-isobutyranilide | F | 9 | 8 | 9 | 7 | 1 | 10 | 10 |
| | 50M | 9 | 9 | 10 | 10 | 10 | 10 | 10 |
| 3'-trifluoromethyl-α-methylvaleranilide | F | 5 | 5 | 10 | 10 | 10 | 9 | 8 |
| | 50M | 10 | 10 | 10 | 10 | 8 | 9 | 7 |
| 3'-trifluoromethyl-α-phenylacetanilide | F | 9+ | 8 | 10 | 10 | 0 | 0 | 0 |
| | 50M | 3 | 10 | 10 | 10 | 0 | 0 | 0 |
| 3'-trifluoromethyl-o-toluanilide | F | 1 | (¹) | (²) | 4 | 2 | 0 | 0 |
| | 50M | 9 | (¹) | (²) | 9 | 0 | 0 | 0 |
| 3'-trifluoromethylcyclohexanecarboxanilide | F | 10 | 10 | 10 | 10 | 10 | 10 | 4 |
| | 50M | 10 | 10 | 9 | 8 | 4 | 10 | 8 |
| 3'-trifluoromethylcyclopentanecarboxanilide | 50M | 10 | 10 | 10 | 10 | 9 | 9 | 1 |

| Compound | Solvent | Phytotoxicity Rating | | | | | | |
|---|---|---|---|---|---|---|---|---|
| | | Beets | Tomatoes | Radish | Johnson Grass | Oats | Wheat | Cucumbers |
| 3'-trifluoromethyl-1-cyclopentenecarboxanilide | F | 10 | 4 | 4 | 7 | 7 | 4 | 4 |
| | 50M | 9 | 10 | 7 | 3 | 5 | 2 | 5 |
| 3'-trifluoromethyl 2,2-dimethylvaleranilide | F | 5 | 2 | 5 | 4 | 0 | 0 | 3 |
| | 50M | 10 | 7 | 10 | 2 | 4 | 4 | 5 |
| 3'-trifluoromethyl-triethylacetanilide | F | 3 | 1 | 3 | 4 | 1 | 2 | 3 |
| | 50M | 9 | 9 | 5 | 1 | 1 | 1 | 4 |
| 3'-trifluoromethyl-1-cyclohexenecarboxanilide | F | 10 | 10 | 10 | 8 | 2 | 6 | 9.5 |
| | 50M | 10 | 9 | 9.5 | 4 | 4 | 4 | 9 |
| 2'-trifluoromethylbenzanilide | F | 0 | 0 | 0 | 1 | 0 | 0 | |
| | 50M | 9 | 0 | 9 | 5 | 8 | 5 | |
| 3'-trifluoromethyl-4-nitrobenzanilide | F | 10 | 7 | 5 | 8 | 1 | 1 | 2 |
| | 50M | 4 | 8 | 5 | 2 | 2 | 2 | 3 |

¹ Gross morphogenic effects—leaf linear, twisting, curling, epinasty, 2,4-D and benzoic acid symptoms—hormonic response.
² Abnormal morphology—twisting, "blunt leaf effect."

It can easily be seen from Table II that 3'-trifluoromethylbenzanilide and 3'-trifluoromethylacetanilide would be useful as herbicides for wild oats in wheat fields since they are strongly toxic to oats and have little or no effect on wheat. 3'-trifluoromethyl-o-toluanilide is also toxic to broadleaf plants except for cotton and beans and is, therefore, useful for killing broadleaf weeds in cotton fields. 2'-trifluoromethylbenzanilide in solvent 50M is a good herbicide for tomatoes since it kills the other dicotyledonous plants and various grasses without injury to the tomato even in the sensitive seedling stage.

Example III.—Selective post-emergence herbicidal activity

The compounds of the invention were tested for selective activity against Johnson grass without injury or with a minimum of injury to cotton, beans or tomatoes. The tests were conducted with individual crops in 4-inch pots for greater accuracy. The cotton crops were approximately six weeks old with well developed secondary leaves and the Red Kidney Beans were three weeks old with well developed secondary leaves and the tomatoes were about one month from the time of transplanting. The Johnson grass was about six weeks old and well into the third leaf stage development and was about 4 inches high.

The crops were sprayed as in Example II with 30 ml. of solution per three pots (2.5 pounds per acre) and after 14 days the plants were scored for phytotoxicity ratings as before. The results are summarized in Table III.

TABLE IIIa.—POST EMERGENCE HERBICIDAL ACTIVITY OF TRIFLUOROMETHYLANILIDE DERIVATIVES ON COTTON, BEANS, TOMATO AND JOHNSON GRASS

| Compound | Solvent | Phytotoxicity Rating | | | |
|---|---|---|---|---|---|
| | | Cotton | Bean | Tomato | Johnson Grass |
| 3'-trifluoromethylbenzanilide | F | 0 | 2 | 0 | 10 |
| | 50M | 1 | 2 | 0 | 10 |
| 3'-trifluoromethylacetanilide | F | 4 | 2 | | 8 |
| | 50M | 5 | 10 | | 6 |
| 3'-trifluoromethyl-2-bromobenzanilide | F | 0 | 3 | 2 | 9 |
| | 50M | 0 | 2 | 3 | 10 |
| 3'-trifluoromethylpropionanilide | F | 1 | 10 | 1 | 10 |
| | 50M | 1 | 10 | 4 | 8 |
| 3'-trifluoromethyl-3,4-dichlorobenzanilide | F | 0 | 2 | 3 | 4 |
| | 50M | 0 | 4 | 4 | 6 |
| 3'-trifluoromethyl-4-nitrobenzanilide | F | 1 | 1 | 7 | 6 |
| | 50M | 2 | 1 | 3 | 8 |
| 3'-trifluoromethylmethacrylanilide | F | 2 | 2 | 9 | 10 |
| | 50M | 2 | 6 | 7 | 10 |
| 3'-trifluoromethylisobutyranilide | F | 1 | 5 | 5 | 10 |
| | 50M | 1 | 7 | 5 | 10 |
| 3'-trifluoromethyl-α-methylvaleranilide | F | 1 | 2 | 3 | 10 |
| | 50M | 0 | 1 | 7 | 9 |
| 3'-trifluoromethyl-2,6-dichlorobenzanilide | F | 1 | | | 8 |
| | 50M | 0 | | | 8 |
| 3'-trifluoromethyl-α-phenylacetanilide | F | 0 | 1 | 8 | 2 |
| | 50M | 0 | 0 | 10 | 2 |
| 3'-trifluoromethyl-o-toluanilide | F | 0 | 2 | | 2 |
| | 50M | 0 | 2 | | 0 |
| 3'-trifluoromethyl-cyclohexanecarboxanilide | F | 0 | 7 | 5 | 5 |
| | 50M | 0 | 4 | 2 | 4 |
| 3'-trifluoromethyl-cyclopentanecarboxanilide | 50M | 1 | 1 | | 10 |

TABLE IIIb

| Compound | Solvent | Flat | | Pots | | | | | |
|---|---|---|---|---|---|---|---|---|---|
| | | Johnson Grass | Cotton | Cotton | Bean | Tomato | Large Johnson Grass | Medium Johnson Grass | Small Johnson Grass |
| 3'-trifluoromethyl-1-cyclopentanecarboxanilide | F | 7 | 2 | 1 | 2 | 4 | 7 | 5 | 9 |
| | 50 | 5 | 2 | 2 | 4 | 6 | 5 | 4 | 3 |
| 3'-trifluoromethyl-2,2-dimethylvaleranilide | F | 8 | 8 | 0.5 | 1 | 4 | 8 | 6 | 8 |
| | 50M | 1 | 2 | 0.5 | 4 | 3 | 4 | 4 | 3 |
| 3'trifluoromethyltriethylacetanilide | F | 3 | 1 | 0.5 | 6 | 4 | 5 | 5 | 7 |
| | 50M | 2 | 3 | 1 | 3 | 4 | 4 | 4 | 4 |
| 3'-trifluoromethyl-1-cyclohexanecarboxanilide | F | 8 | 3 | 1.5 | 2 | 3 | 10 | 7 | 7 |
| | 50 | 5 | 4 | --- | 3 | 7 | 7 | 5 | 6 |
| 3'-trifluoromethyl-4-nitrobenzanilide | F | 9 | 4.5 | 2 | 1 | 1 | 9 | 10 | ¹5 |
| | 50M | 2 | 4 | 1 | 3 | 4 | 1 | 1 | 1 |

¹ Growth stopped.

As can be noted from Table III, the trifluoromethylanilides of the invention possess a very good herbicidal activity against Johnson grass while being non-phytotoxic to cotton or possess a very low toxicity to cotton while 3',4'-dichloropropionanilide gave a 100% kill of both Johnson grass and cotton and 3-(3,4-dichlorophenyl)-1,1-dimethyl urea had a toxicity rating of 6. Certain of the trifluoromethylanilides also showed little or no toxicity to tomato and/or bean plants. For example, 3'-trifluoromethylbenzanilide and 3' - trifluoromethyl - α-methylvaleranilide are relatively harmless to bean plants and highly toxic to Johnson grass. Also, 3'-trifluoromethylcyclopentanecarboxanilide protected bean plants against mildew (*E. polygoni*) attack.

Example IV.—Pre-emergence herbicidal activity by seed germination test

The trifluoromethylanilides for this test were formulated as wettable powders containing 25% of the said compounds and 75% by weight of pre-mix consisting of 92% by weight of Hi Sil 232 (a hydrated silica pigment), 4% by weight of Marasperse N (a lignosulfonate) and 4% by weight of Pluronic L 61 (an ethylene oxide-propylene oxide condensate). The test procedure followed consisted of placing two pieces of filter paper in the top portion of sterile plastic Petri plates and adding 5 ml. of an aqueous dispersion containing 2500 p.p.m. of the wettable powder. 25 seeds were then placed on the filter paper pads and the bottom of the Petri plates were inverted thereover to act as a seal.

The plates were examined daily and at the end of seven days final observations were made on the percent of germination and effect on germination, and a phytotoxicity rating was made. The phytotoxicity rating was based on the scale of 0 (no phytotoxicity) to 10 (total kill). Total kill included seeds which were killed or seeds where the cotyledons attempted to emerge and were then killed. The results are summarized in Table IV.

TABLE IV.—EFFECT OF CHEMICALS ON SEED GERMINATION IN PETRI PLATES

| Compound | Variable | Radish | Barley | Cucumber |
|---|---|---|---|---|
| 3'-trifluoromethyl benzanilide | Percent Germ | 72 | 82 | 74 |
| | P.R. | 1 | 0 | ⁵5 |
| 3'-trifluoromethyl acetanilide | Percent Germ | 12 | 12 | 92 |
| | P.R. | 9 | 9 | ⁶9 |
| 3'-trifluoromethyl-2-bromobenzanilide | Percent Germ | 78 | 70 | 94 |
| | P.R. | 1 | 1 | ⁷4 |
| 3'-trifluoromethyl propionanilide | Percent Germ | 16 | 10 | 94 |
| | P.R. | 9+ | 10 | ⁶9+ |
| 3'-trifluoromethyl-3,4-dichlorobenzanilide | Percent Germ | 44 | 62 | 88 |
| | P.R. | 3 | 1 | ⁵7 |
| 3'-trifluoromethyl-4-nitrobenzanilide | Percent Germ | 76 | 70 | 86 |
| | P.R. | 0 | 1 | 3 |
| 3'-trifluoromethyl methacrylanilide | Percent Germ | 30 | 30 | 64 |
| | P.R. | ³8 | ²8 | ¹8 |
| 3'-trifluoromethyl isobutyranilide | Percent Germ | 62 | 18 | 88 |
| | P.R. | ⁵5 | ⁴9 | ¹8 |
| 3'-trifluoromethyl-α-methylvaleranilide | Percent Germ | 60 | 40 | 98 |
| | P.R. | 3 | ⁴9 | 3 |
| 3'-trifluoromethyl-2,6-dichlorobenzanilide | Percent Germ | 76 | 70 | 88 |
| | P.R. | 0 | 1 | ⁵2 |
| Untreated | Percent Germ | 64 | 80 | 82 |
| | P.R. | 0 | 0 | 0 |

¹ No roots—short, flat, etiolated cotyledon inhibition.
² Trace roots only—no cotyledons.
³ Roots scarce—yellow cotyledons.
⁴ General severe inhibition.
⁵ Inhibition—½ size of checks.
⁶ Cotyledons emerge ⅛ to ¼ inch from seed, and then are completely inhibited from further growth.
⁷ Inhibition of cotyledonary growth.

As can be seen from Table IV, the compounds having the most general phytotoxicity to the seeds or emerging cotyledons are 3'-trifluoromethylacetanilide, 3'-trifluoromethylpropionanilide, 3'-trifluoromethylmethacrylanilide, 3' - trifluoromethylisobutyranilide and 3'-trifluoromethyl-α-methylvaleranilide.

Example V.—Pre-emergence herbicidal activity

Flats were planted with the test crops and three days later the flats were drenched with an aqueous solution of the compounds formulated as 10% emulsion concentrate in Solvent F as in Example II at a dosage equivalent to 10 pounds per acre by a broadcast application method or 2.5 to 3 pounds per acre by a row treatment application method. The plants were observed daily and after two weeks the final phytotoxicity rating was determined.

The phytotoxicity rating was based on a scoring system of 0 (no effect) to 10 (complete kill). A number of phytocidal symptoms from varying degrees of inhibition suppression of growth, chlorosis, necrosis and kill were considered. Kill could be due to lack of emergence above ground or death of seedlings after emergence.

TABLE V.—PRE-EMERGENCE HERBICIDAL ACTIVITY OF TOLUIDIDES
[10 Lbs. Per Acre]

| Compound | Phytotoxicity Rating | | | | | | | |
|---|---|---|---|---|---|---|---|---|
| | Beets | Tomato | Radish | Flax | Rye Grass | Oats | Wheat | Johnson Grass |
| 3'-trifluoromethylbenzanilide | 7-i | 8-i | 3 | 1 | 0 | 1-i | 1-i | 2-i |
| 3'-trifluoromethylacetanilide | 7-i | 6-i | 4 | 1 | 0 | 1 | 1 | 1-i |
| 3'-trifluoromethyl-2-bromobenzanilide | 5-i | 6-i | 3 | 4-i | 0 | 0 | 0 | 1-i |
| 3'-trifluoromethylpropionanilide | 3-i | 4-i | 10 | 7 | 0 | 0 | 0 | 3-i |
| 3'-trifluoromethyl-3,4-dichlorobenzanilide | 3-i | 6-i | 3 | 4 | 0 | 0 | 0 | 2-i |
| 3'-trifluoromethyl-4-nitrobenzanilide | 2-i | 3-i | 3 | 2 | 0 | 0 | 0 | 1-i |
| 3'-trifluoromethylmethacrylanilide | 10-k | 10-k | 9 | 6-i | 3-i | 3-i | 3-i | 8 |

| Compound | Phytotoxicity Rating | | | | | | | | | | |
|---|---|---|---|---|---|---|---|---|---|---|---|
| | Beets | Tomato | Radish | Flax | Rye Grass | Oats | Wheat | Johnson Grass | Pig weed | Soy Beans | Pea nuts |
| 3'-trifluoromethylisobutyranilide | 8-i | 8-i | 10-k | 9-k | 6-i | 6-i | 2-i | 1-i | | | |
| 3'-trifluoromethyl-α-methylvaleranilide | 10-k | 10-k | 10-k | 10-k | 7-i | 3-i | 2-i | 2-i | | | |
| 3'-trifluoromethyl-2,6-dichlorobenzanilide | 7-i | 5-i | 2-i | 1 | 1-i | 0 | 0 | 2-i | | | |
| 3'-trifluoromethyl-2,2-dimethylvaleranilide | 8 | 4 | 2 | | | 6 | 6 | 4 | | | |
| 3'-trifluoromethyltriethylacetanilide | 0 | 0 | 0 | | | 6 | 1 | 0 | | | |
| 3'-trifluoromethylcyclohexanecarboxanilide | 7-i | 7-i | 2-i | | | 0 | 0 | 2-i | | | |
| 3'-trifluoromethylcyclopropanecarboxanilide | 10 | 10 | 8 | | | 1 | 3-i | 3-i | 10 | 3 | 0 |
| Solvent F | 2-i | 2-i | 2-i | 1-i | 0 | 1-i | 1-i | 0 | | | |

In the above table, (i) in the table means that the plants were affected mainly by inhibition of growth while (k) indicates that the plants were killed after emergence.

As can be evidenced from the table, the 3'-trifluoromethylanilides of the invention possess pre-emergence herbicidal activity in addition to their post-emergence herbicidal activity.

Example VI.—Pre-emergence herbicidal activity

Flats were filled with soil and rows of 25 seeds each of beets, tomatoes, radishes, oats, wheat and rye grass, 50 seeds of Johnson grass and 20 seeds of cotton were planted. The flats were uniformly covered with the same amount of soil which was lightly tampled to give a uniform flat surface for drench application of the test compounds.

3' - trifluoromethylcyclohexanecarboxanilide was prepared as a 10% emulsion concentrate in Solvent F of Example II and was diluted to the desired concentration before application at a dosage ratio of 10 pounds per acre. The other trifluoromethylanilide was prepared as a 25% wettable powder with 75% of pre-mix consisting of 92% by weight of Hi Sil 232 (a hydrated silica pigment), 4% by weight of Marasperse N (a lignosulfonate) and 4% by weight of Pluronic L 61 (an ethyleneoxide-propyleneoxide condensate) which was diluted with water before application at a dosage rate of 10 pounds per acre. After the flats were drenched, they were covered with paper for 3 days to prevent drying out during germination and were uniformly watered for 3 days after first emergence. When the plants were 3 weeks old, a phytotoxicity rating was taken and the results are summarized in Table VI.

TABLE VII.—POST-EMERGENCE HERBICIDAL ACTIVITY OF 3'-TRIFLUOROMETHYLCYCLOPROPANECARBOXANILIDE

| Crops | Phytotoxicity Rating | |
|---|---|---|
| | Solvent F | Solvent 50M |
| Cotton | 2 | 5 |
| Soybeans | 5 | 5 |
| Red Kidney Beans | 7 | 7 |
| Tomato | 10 | 10 |
| Cucumber | 10 | 10 |
| Beets | 10 | 10 |
| Radish | 10 | 9 |
| Johnson Grass: | | |
| Small | 6 | 7 |
| Medium | 7.5 | 4 |
| Corn | 5 | 3 |
| Wheat | 6 | 5 |
| Oats | 5 | 5 |
| Wild Oats | 3 | 3 |

Example VIII.—Systemic mildewcidal activity

Red kidney beans in 4 inch pots were grown until they reached a point where the cotyledonary leaves were well expanded and essentially full grown and the first primordial growth of the first true leaves had occurred. The said bean plants were then infected with bean mildew (Erysiphe polygoni), for 48 hours, after which they were sprayed with an aqueous emulsion of 1000 p.p.m. of 3'-trifluoromethylcyclohexane carboxanilide. The said carboxanilide was originally prepared as an emulsion concentrate consisting of 10% of the said carboxanilide, 10% of Triton X–161 and 80% of a 50:50 mixture mixture of butylcarbitol acetate and Velsicol AR 50. The sprayed plants were again subjected to infection with bean mildew for a period of two weeks after which a mildewcidal rating was taken, using the scale of 0 (no control), to 5 (complete control). The rating on the cotyledonary leaves was 5- and 2 on the first true leaves, which demonstrates systemic mildewcidal activity under extreme conditions.

TABLE VI

| Compound | Phytotoxicity Rating | | | | | | | | |
|---|---|---|---|---|---|---|---|---|---|
| | Dosage | Beets | Tomato | Radish | Flax | Rye Grass | Oats | Wheat | Johnson Grass | Cotton |
| 3'-trifluoromethylcyclopropanecarboxanilide | 10 | 10 | 10 | 8 | | | 1 | 3-i | 3-i | 1-i |
| 3'-trifluoromethylcyclohexanecarboxanilide | 10 | 7-i | 7-i | 3 | 4 | 0 | 0 | 0 | 1-i | |
| 3'-trifluoromethyl-4'chlorocyclopropanecarboxanilide | 10 | 10 | 10 | 10 | | | 9 | 5 | 10 | 0 |
| 2'-chloro-5'-trifluoromethylcyclopropanecarboxanilide | 10 | 10 | 8 | 5-y | | | 0 | 0 | 2 | | i=inhibition of plants. y=yellowing.

Example VII

Using the procedure of Example II, the general post-emergence herbicidal activity of 3'-trifluoromethylcyclopropanecarboxanilide was determined on a variety of plants in Solvents F and 50M. The results are summarized in Table VII.

Example IX

Using the procedure of Example II, the following compounds in Solvent F were applied at a dosage of 2.4 pounds per acre to a variety of crops and th ephytotoxicity values on a scale of 0 to 10 were determined. The results are summarized in Table VIII.

TABLE VIII

| Compounds | Phytotoxicity Rating | | | | | | | | | | | | |
|---|---|---|---|---|---|---|---|---|---|---|---|---|---|
| | Beets | Tomato | Radish | Rice | Oats | Wheat | Cucumbers | Red Kidney Beans | Soy Beans | Johnson Grass | | | Cotton | Corn |
| | | | | | | | | | | Small | Medium | Large | | |
| 3'-trifluoromethylcyclopropanecarboxanilide | 10 | 8 | 9+ | 2 | 3 | 9+ | 10 | 10 | 4 | 10 | 9+ | 9+ | 3 | 10 |
| 3'-chlorocyclopropanecarboxanilide | 10 | 10 | 10 | 3 | 9 | 10 | 10 | 10 | 8 | 10 | 10 | 9 | 9 | 10 |
| 3'-trifluoromethyl-4'-chlorocyclopropanecarboxanilide | 10 | 10 | 10 | 3 | 10 | 10 | 10 | 10 | 7 | 10 | 10 | 9+ | 2 | 10 |
| 3',4'-dichlorocyclopropanecarboxanilide | 10 | 10 | 10 | 10 | 10 | 10 | 10 | 9 | 9 | 10 | 10 | 10 | 9 | 10 |

The data in Table VIII shows that 3'-trifluoromethyl-4'-chlorocyclopropanecarboxanilide is safe for rice and cotton and is useful for selective grass and broad leaf weed control in these crops, while the corresponding 3',4'-dichoro compound lacks any selective herbicidal activity. Also, 3'-trifluoromethylcyclopropanecarboxanilide in addition to being safe for cotton and rice crops, is safe for oats and is useful for selective grass and broad leaf weed control for these crops while the corresponding 3'-chloro compound is highly toxic to cotton and oats.

Example X

Using the procedure of Example II, the herbicidal activity of the following compounds in Solvents F and 50M at a dosage of 2.4 pounds per acre was determined on a variety of crops. The results are summarized in Table IX.

TABLE IX.—POST-EMERGENCE HERBICIDAL ACTIVITY

| Compounds | Solvent | Beet | Tomato | Radish | Oats | Wheat | Cucumber | Pigweed | Johnson Grass | | | Soy Beans | Red Kidney Beans | Cotton |
|---|---|---|---|---|---|---|---|---|---|---|---|---|---|---|
| | | | | | | | | | Small | Medium | Large | | | |
| 3'-trifluoromethyl-4'-chloroacetanilide | F | 10 | 8 | 8 | 4 | 0 | 10 | 3 | 5 | 6 | 7 | 5 | 6 | 3 |
| | 50M | 9 | 8 | 5 | 0 | 0 | 9 | 6 | 2 | 5 | 6 | 7 | 9 | 4 |
| 3'-trifluoromethyl-4'-chloropropionanilide | F | 9 | 6 | 5 | 0 | 0 | 10 | 3 | 9 | 5 | 5 | 5 | 9 | 4 |
| | 50M | 10 | 9 | 5 | 2 | 2 | 8 | 3 | 1 | 5 | 6 | 5 | 10 | 5 |
| 3'-trifluoromethyl-4'-chlorocrotonanilide | F | 7 | 6 | 5 | 2 | 2 | 8 | 1 | 3 | 4 | 4 | 5 | 10 | 3 |
| | 50M | 8 | 9 | 6 | 0 | 3 | 8 | 3 | 3 | 5 | 5 | 5 | 6 | 5 |
| 3'-trifluoromethyl-4'-chlorocyclobutanecarboxanilide | F | 7 | 5 | 5 | 4 | 2 | 9 | 2 | 5 | 5 | 5 | 4 | 6 | 1 |
| | 50M | 9 | 7 | 3 | 3 | 1 | 9 | 2 | 4 | 5 | 5 | 4 | 9 | 2 |
| 3'-trifluoromethyl-4'-chlorocyclopropanecarboxanilide | F | 10 | 10 | 9 | 8 | 7 | 10 | 3 | 5 | 8 | 8 | 6 | 10 | 2 |
| | 50M | 10 | 10 | 9 | 10 | 8 | 10 | 5 | 7 | 5 | 6 | 7 | 10 | 5 |
| 3'-trifluoromethyl-6'-chlorocyclopropanecarboxanilide | F | 2 | 5 | 1 | 0 | 0 | 7 | 2 | 5 | 9 | 10 | 4 | 3 | 0 |
| | 50M | 3 | 4 | 2 | 0 | 0 | 5 | 7 | 3 | 3 | 2 | 3 | 3 | 0 |

Example XI.—Defoliation of plants

Cotton plants in pots which were well into the second true leaf stage were sprayed with 30 ml. of a solution of 3'-trifluoromethylacetanilide in Solvent F at a concentration of 2000 p.p.m. The plants were kept under observation and after 7 days there was 100% defoliation of the cotton. A similar test with beans also gave 100% defoliation of the bean plants.

Various modifications of the compositions of the invention may be made without departing from the spirit or scope thereof, and it should be understood that the invention is intended to be limited only as defined in the appended claims.

I claim:

1. Herbicidal compositions comprising a herbicidally effective amount of trifluoromethylanilide having the formula

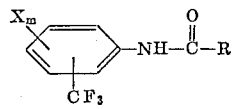

wherein X is selected from the group consisting of halogen, nitro, lower alkoxy, —$NH_2$ and mono- and di-lower alkyl amino, $m$ is an integer from 0 to 2 and R is selected from the group consisting of aryl radicals and aralkyl radicals in which the alkyl chain has 1 to 6 carbon atoms and a major amount of an inert carrier.

2. Herbicidal compositions comprising a herbicidally effective amount of trifluoromethylanilide having the formula

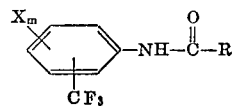

wherein X is selected from the group consisting of halogen, nitro, lower alkoxy, —$NH_2$ and mono- and di-lower alkyl amino, $m$ is an integer from 0 to 2 and R is selected from the group consisting of aryl radicals having the formula

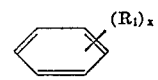

and aralkyl radicals having the formula

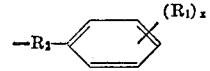

wherein $R_1$ is selected from the group consisting of halogen and lower alkyl, $R_2$ is a lower alkylene or alkenylene radical and $x$ is an integer from 1 to 5 and a major amount of an inert carrier.

3. The compositions of claim 2 wherein the said trifluoromethylanilide is 3'-trifluoromethylbenzanilide.

4. The compositions of claim 2 wherein the said trifluoromethylanilide is 3'-trifluoromethyl-2-bromobenzanilide.

5. The compositions of claim 2 wherein the said trifluoromethylanilide is 3'-trifluoromethyl-2,6-dichlorobenzanilide.

6. The compositions of claim 2 wherein the said trifluoromethylanilide is 3' - trifluoromethyl - 3,4 - dichlorobenzanilide.

7. The compositions of claim 2 wherein the said trifluoromethylanilide is 3'-trifluoromethyl-o-toluanilide.

8. A method of selectively killing plants which comprises contacting the plants with an herbicidally effective amount of a trifluoromethylanilide having the formula

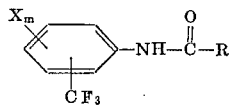

wherein X is selected from the group consisting of halogen, nitro, lower alkoxy, —NH$_2$ and mono- and di-lower alkyl amino, $m$ is an integer from 0 to 2 and R is selected from the group consisting of aryl radicals and aralkyl radicals wherein the alkyl chain has 1 to 6 carbon atoms.

9. A method of selectively killing plants which comprises contacting the plants with an herbicidally effective amount of trifluoromethylanilide having the formula

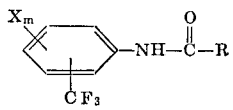

wherein X is selected from the group consisting of halogen, nitro, lower alkoxy, —NH$_2$ and mono- and di-lower alkyl amino, $m$ is an integer from 0 to 2, R is selected from the group consisting of hydrogen, lower alkyl and halogenated lower alkyl radicals having 1 to 7 carbon atoms, lower alkenyl radicals having 2 to 7 carbon atoms, aryl radicals having the formula

and aralkyl radicals having the formula

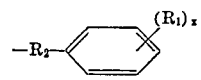

wherein $R_1$ is selected from the group consisting of halogen and lower alkyl, $R_2$ is a lower alkylene radical and $x$ is an integer from 1 to 5.

10. The method of claim 9 wherein the trifluoromethylanilide is 3'-trifluoromethylbenzanilide.

11. The method of claim 9 wherein the trifluoromethylanilide is 3'-trifluoromethyl-2-bromobenzanilide.

12. The method of claim 9 wherein the trifluoromethylanilide is 3'-trifluoromethyl-2,6-dichlorobenzanilide.

13. A method of selectively killing plants which comprises adding to the soil before plant germination an herbicidally effective amount of a trifluoromethylanilide having the formula

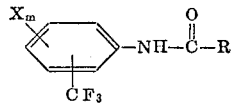

wherein X is selected from the group consisting of halogen, nitro, lower alkoxy, —NH$_2$ and mono- and di-lower alkyl amino, $m$ is an integer from 0 to 2 and R is selected from the group consisting of aryl radicals and aralkyl radicals wherein the alkyl chain has 1 to 6 carbon atoms.

References Cited

UNITED STATES PATENTS

| 3,340,042 | 9/1967 | Schwartz. | |
| 3,246,975 | 4/1966 | Hopkins et al. | 71—2.5 |

FOREIGN PATENTS

| 1,005,784 | 4/1957 | Germany. |

JAMES O. THOMAS JR., *Primary Examiner.*